2,758,985

N-ALKOXYMETHYL POLYCARBONAMIDES STABILIZED WITH DICYANDIAMIDE

Daniel E. Strain, Wilmington, Del., assignor to E. I. du Pont de Nemours and Company, Wilmington, Del., a corporation of Delaware No Drawing. Application June 26, 1953,
Serial No. 364,469

5 Claims. (Cl. 260—45.9)

This invention relates to improving the thermal stability of linear N-alkoxymethyl polycarbonamide compositions.

The N-alkoxymethyl polycarbonamides, in which the carbonamide groups are recurring intralinear units in the main polymer chain, have been known for several years (cf. U. S. Patents 2,430,860, 2,430,908, 2,430,810, 2,430,923). They are polyamide derivatives which have a wide range of utility, including the manufacture of molded articles. In the latter application, it is important to have present in the molding powder a high temperature stabilizer which makes possible the use of elevated temperatures for extrusion and injection molding.

An object of this invention is to improve the thermal stability of linear N-alkoxymethyl polycarbonamides. Another object is to provide a superior stabilizer for N-alkoxymethyl polycarbonamides, and more particularly one which is readily absorbed, and which does not adversely affect the valuable and desirable properties of these polymers, e. g. tensile strength, flex life, aging and weathering resistance, tear strength, etc.

It has been discovered, according to this invention, that dicyandiamide is an outstandingly effective and efficient high temperature stabilizer for linear N-alkoxymethyl polycarbonamides.

The N-alkoxymethyl polycarbonamides which are stabilized by dicyandiamide according to this invention are derived from polyamides of the general kind disclosed in U. S. Patents 2,071,250, 2,071,253, and 2,130,948, and may be prepared by processes described in U. S. Patents 2,430,860, 2,430,866, 2,430,867, and 2,430,875. The percentage of substitution of amide hydrogens by N-alkoxymethyl groups can be varied very widely. Generally speaking, the products which are most effectively stabilized by dicyandiamide according to this invention have N-alkoxymethyl substituents on about 30 to 50% of the amide groups. The percentage of substitution is reflected in the solubility characteristics of the N-alkoxymethyl polyamide, and this can be indicated by the so-called "dilution value." Dilution value is the number of cc. of acetone required to produce cloudiness in a boiling solution obtained by dissolving one gram of N-alkoxymethyl polyamide in 20 cc. of aqueous 80% (by weight) ethyl alcohol. The preferred N-alkoxymethyl polyamides have dilution values of about 30 to 100 (referred to herein as DV-30, DV-100, etc.). Treatment of the N-alkoxymethyl polyamides with caustic to remove N-methylol groups as taught in U. S. 2,430,875 has a beneficial effect on the products which are employed in the practice of this invention.

The amount of dicyandiamide which is added, for optimum results, is within the range of 2.0 to 15% of the weight of N-alkoxymethyl polyamide. The method of incorporating the stabilizer in the resin can be varied somewhat; suitable methods include extrusion-compounding of dry-blended ingredients, absorption of dicyandiamide from an aqueous solution, rolling, milling, banburying, and the like. It is helpful to have present in the composition a small amount (usually 0.2 to 1.0%) of a mold lubricant. Among the mold lubricants, those of the soap type, e. g. sodium stearate and stearic acid, are most satisfactory, although any resin mold lubricant may be employed.

The following table records the properties of N-(methoxymethyl)hexamethylene polyadipamide, containing 5% by weight of dicyandiamide, (94.5% N-(methoxymethyl)hexamethylene polyadipamide, 0.5% Na stearate) (columns 1 and 2) as compared with the corresponding properties of the unstabilized polymer (column 3).

TABLE I

PROPERTIES OF HEAT STABILIZED N-(METHOXYMETHYL) POLYADIPAMIDE AS COMPARED WITH UNSTABILIZED N-(METHOXYMETHYL) POLYADIPAMIDE

|  | (1) | (2) | (3) Control |
|---|---|---|---|
| Dilution value, DV | 45 | 55 | 55 |
| Percent dicyandiamide | 5.0 | 5.0 | 0 |
| Ultimate elongation: | | | |
| Dry—50% R. H. 23° C. (percent) | 470 | 840 | 458 |
| Wet—soaked 24 hours (percent) | 350 | 575 | |
| Yield Point, 50% R. H., 23° C. (p. s. i.) | 2,120 | 1,350 | 1,660 |
| 100% Modulus, 50% R. H., 23° C. (p. s. i.) | 2,010 | 1,420 | |
| Stiffness v. temperature (Tinius-Olsen), p. s. i.: | | | |
| 0° C.: | | | |
| −10 | | 23,700 | |
| 0 | | 14,500 | |
| 10 | | 13,900 | |
| 23 | 25,200 | 12,200 | 17,600 |
| 35 | | 10,600 | 15,700 |
| 40 | 21,200 | | |
| 50 | | 8,090 | 11,900 |
| 55 | 16,600 | | |
| 65 | | 6,490 | 9,380 |
| 75 | 13,400 | | |
| 85 | | 4,730 | 7,880 |
| 90 | 11,500 | | |
| 100 | 9,800 | 3,520 | 6,540 |

TABLE I—Continued

|  | (1) | | (2) | | (3) Control | |
|---|---|---|---|---|---|---|
| Stiffness v. time, p. s. i.: Temperature, °C | 23 | 50 | 23 | 50 | 23 | 50 |
| Initial | 24,800 | 24,500 | 12,800 | 12,800 | 8,550 | 7,850 |
| 1 mo | 25,300 | 28,300 | 14,250 | 16,500 | 9,635 | 10,600 |
| 2 mos | 26,340 | 30,360 | 14,350 | 15,500 | 9,880 | 10,500 |
| 3 mos | 26,180 | 33,500 | | | | |
| 4 mos | | | 13,600 | 14,600 | 9,050 | 8,840 |
| 5 mos | | | 14,000 | 15,550 | 9,780 | 9,305 |
| 6 mos | | | 15,300 | 16,760 | 10,250 | 10,140 |
| 7 mos | | | 14,550 | 16,950 | 10,700 | 10,420 |
| 8 mos | | | 15,800 | 18,300 | 11,150 | 11,160 |
| 9 mos | | | 17,700 | 18,950 | 11,050 | 11,550 |
| Percent H₂O in bar (after 9 mos. testing) | | 2.23 | .30 | 2.32 | 0.36 | |
| Weathering resistance: | | | | | | |
| Tensile strength, p. s. i.: | | | | | | |
| Initial | | 2,850 | | 2,700 | | 3,350 |
| 100 hrs. exposure, weatherometer | | 2,680 | | 2,590 | | 3,050 |
| 300 hrs. exposure, weatherometer | | | | 2,330 | | 2,750 |
| Elongation, Percent: | | | | | | |
| Initial | | 420 | | 448 | | 458 |
| 100 hrs. exposure, weatherometer | | 392 | | 430 | | 476 |
| 300 hrs. exposure, weatherometer | | | | 310 | | 380 |
| Yield point, p. s. i.: | | | | | | |
| Initial | | 1,590 | | 1,380 | | 1,660 |
| 100 hrs. exposure, weatherometer | | 1,630 | | 1,350 | | 1,610 |
| 300 hrs. exposure, weatherometer | | | | 1,610 | | 1,800 |
| Instron slit tear, lb./in.: | | | | | | |
| Initial | | | | 199 | | 269 |
| 100 hrs. exposure, weatherometer | | | | 146 | | 154 |
| Flex life, MIT: | | | | | | |
| Initial | | | | [1] 1,000,313 | | [1] 1,296,629 |
| 100 hrs. exposure, weatherometer | | | | [1] 1,002,111 | | [1] 1,003,088 |
| Tear strength: | | | | | | |
| Elmendorf—23° C., 50% R. H. (gms./mil thickness) | | 353 | | 315 | | |
| Instron slit-tear | | 154 | | 90.3 | | 122 |
| Shore durometer hardness: "D" scale | | 40 | | 35-40 | | 39 |
| Softening point (° C.) | | Ca. 155 | | Ca. 135 | | Ca. 140 |
| Moisture vapor permeability [2] cellophane method: | | | | | | |
| 2 mil film g/100 m²hr | | 2,970 | | 3,510 | | |
| 10 mil film g/100 m²hr | | 1,330 | | 2,340 | | 2,180 |
| Water absorption (23° C.): | | | | | | |
| After 24 hrs. (Percent) (D570 ASTM test) | | 8.30 | | 13.8 | | 13.7 |
| At saturation (30 day immersion, corrected for water surplus) | | 20.9 | | 25.5 | | 25.4 |
| Density (23° C.) | | 1.1386 | | 1.137 | | 1.128 |
| Low temperature brittleness (Olsen, D746) °C | | −20 | | −30 | | −38 |
| Extrusion temperature range (° C.) | | 170-215 | | 165-95 | | 160-175 |
| Injection molding temperature range (° C.) | | 160-90 | | 160-90 | | 165-175 |

[1] No failure.
[2] Compression molded film.

The invention is illustrated further by means of the following examples.

*Example 1.*—A molding powder containing 1 wt. percent dicyandiamide was prepared from the following composition:

| | Parts |
|---|---|
| N - (methoxymethyl)hexamethylene polyadipamide DV–55 | 985 |
| Dicyandiamide | 10 |
| Stearic acid (mold lubricant) | 5 |
| Methanol | 120 |
| Distilled water | 75 |

The ingredients were blended by tumbling in a rotating container after which they were compacted between mill rolls at 100° to 120° C. During the latter operation the methanol and water were volatilized. The resulting product was ground through ¼" mesh screen in an Abbé cutter, and dried for 24 hours "in vacuo" at 60° to 70° C. to a final moisture content of 0.2%.

The resulting molding powder was then satisfactorily injection-molded in a 1 oz. (per injection) machine over the range of 155° to 185° C.

*Example 2.*—A molding powder containing approximately 3% dicyandiamide, otherwise the same as the composition of Example 1, was satisfactorily injection molded over the range of 155° to 195° C.

*Example 3.*—A control molding powder, unstabilized, was prepared from the following composition:

| | Per cent |
|---|---|
| N - (methoxymethyl)hexamethylene polyadipamide DV–55 | 99.5 |
| Stearic acid | 0.5 |

This composition was prepared by the same procedure described in Examples 1 and 2. During injection molding, bars of satisfactory surface were produced only over the range of 165 to 175° C.

*Example 4.*—A molding powder containing 2½% dicyandiamide was prepared by the following recipe:

| | Parts |
|---|---|
| N-(methoxymethyl)hexamethylene polyadipamide DV–55 | 497.5 |
| Stearic acid | 2.5 |
| Dicyandiamide | 12.5 |
| Methanol | 80.0 |
| Water | 50.0 |

Compacting of these ingredients was by the procedure described in Example 1. On extrusion in standard type extrusion equipment, the resulting powder produced satisfactory extrudates over the temperature range of 165 to 195° C.

*Example 5.*—A molding powder containing 5% dicyandiamide was prepared by the following recipe:

| | Parts |
|---|---|
| N - (methoxymethyl)hexamethylene polyadipamide DV–55 | 420 |
| Dicyandiamide | 25 |
| Stearic acid | 2.5 |
| Methanol | 80.0 |
| Distilled water | 50.0 |

The above ingredients were compacted into a molding powder by the same procedure as in Example 1. On extrusion, satisfactory extrusions were obtained over the range of 165° to 195° C.

*Example 6.*—The following recipe, containing 10% dicyandiamide was compacted into a molding powder by the procedure described in Example 1.

| | Parts |
|---|---|
| N-(methoxymethyl)hexamethylene polyadipamide DV-55 | 447.5 |
| Dicyandiamide | 50.0 |
| Stearic acid | 2.5 |
| Methanol | 80.0 |
| Distilled water | 50.0 |

This composition extruded satisfactorily over the range of 170° to 210° C.

*Example 7.*—The following control composition was compounded as previously described and evaluated for its extrusion properties over the temperature range of 150° to 175° C.

| | Parts |
|---|---|
| N-(methoxymethyl)hexamethylene polyadipamide DV-55 | 497.5 |
| Stearic acid | 2.5 |
| Methanol | 80.0 |
| Water | 50.0 |

Extrusion of this composition at 170° to 210° C. range resulted in poor flow and extrudates having rough surface. Smoothed surface monofils could not be obtained over the temperature range tested.

*Example 8.*—A stabilized composition containing the following ingredients was compounded into a molding powder and evaluated for its extrusion characteristics.

| | Parts |
|---|---|
| N-(methoxymethyl)hexamethylene polyadipamide DV-45 | 69.25 |
| Dicyandiamide | 3.65 |
| Sodium stearate | 0.37 |

The ingredients were dry-blended, and extrusion-compounded in a continuous plasticator equipped with a fly-knife cutter, producing ¼" diameter pellets. Pellets were then dried "in vacuo" at 100° to 150° C. for 16 hours in preparation for evaluating extrusion properties. On extrusion, the composition extruded satisfactorily over the range of 170° to 215° C.

The products which are obtained by the method of this invention are well suited for injection molding and extrusion, and for other such applications involving plastic flow at elevated temperatures.

I claim:

1. An N-alkoxymethyl linear polycarbonamide having recurring carbonamide groups as an integral part of the main polymer chain, admixed with 2.0 to 15.0% of its weight of dicyandiamide.

2. An N-(methoxymethyl)hexamethylene polyadipamide, admixed with 2.0 to 15.0% of its weight of dicyandiamide.

3. Composition of claim 2 wherein the N-(methoxymethyl)hexamethylene polyadipamide has a dilution value of from 30 to 100, said dilution value being defined as the number of cc. of acetone required to produce cloudiness in a boiling solution of one gram of the N-alkoxymethyl polyamide in 20 cc. of aqueous ethyl alcohol having an ethyl alcohol content of 80% by weight.

4. The process which comprises injection molding the composition of claim 3.

5. The process which comprises extruding the composition of claim 3.

References Cited in the file of this patent

UNITED STATES PATENTS

| 2,322,938 | Howard | June 29, 1943 |
| 2,366,492 | Cox | Jan. 2, 1945 |